United States Patent
Kim et al.

(10) Patent No.: US 7,169,500 B2
(45) Date of Patent: Jan. 30, 2007

(54) MEMBRANE-ELECTRODE ASSEMBLY OF FUEL CELL, PRODUCTION METHOD OF THE SAME, AND FUEL CELL EMPLOYING THE SAME

(75) Inventors: Hae-kyoung Kim, Kyungki-do (KR); Ji-rae Kim, Seoul (KR)

(73) Assignee: Samsung SDI Co., Ltd., Suwon (KR)

(*) Notice: Subject to any disclaimer, the term of this patent is extended or adjusted under 35 U.S.C. 154(b) by 324 days.

(21) Appl. No.: 10/449,776

(22) Filed: Jun. 2, 2003

(65) Prior Publication Data

US 2004/0081877 A1  Apr. 29, 2004

(30) Foreign Application Priority Data

Oct. 26, 2002  (KR)  ............... 10-2002-0065659

(51) Int. Cl.
*H01M 8/10* (2006.01)
*H01M 4/00* (2006.01)

(52) U.S. Cl. ............... 429/33; 429/30; 429/40

(58) Field of Classification Search ........ 429/30, 429/33, 40
See application file for complete search history.

(56) References Cited

U.S. PATENT DOCUMENTS

| | | | |
|---|---|---|---|
| 5,474,857 A * | 12/1995 | Uchida et al. | 429/33 |
| 5,702,755 A | 12/1997 | Mussell | |
| 5,871,860 A * | 2/1999 | Frost et al. | 429/40 |
| 6,060,187 A * | 5/2000 | Uchida et al. | 429/30 |
| 6,180,276 B1 | 1/2001 | Kim et al. | |
| 6,440,594 B1 * | 8/2002 | Kindler et al. | 429/13 |
| 2001/0027160 A1 * | 10/2001 | Lee et al. | 502/101 |
| 2004/0082163 A1 * | 4/2004 | Mori et al. | 438/630 |

FOREIGN PATENT DOCUMENTS

| | | |
|---|---|---|
| JP | 6-203848 | 7/1994 |
| JP | 6-203849 | 7/1994 |
| JP | 6295729 | 10/1994 |

(Continued)

OTHER PUBLICATIONS

Escudero, M.J., et al. "*Development and performance characterisation of new electrocatalysts for PEMFC*," 106 Journal of Power Sources 206-214 (2002).

(Continued)

*Primary Examiner*—Dah-Wei Yuan
(74) *Attorney, Agent, or Firm*—Buchanan Ingersoll and Rooney PC

(57) ABSTRACT

The present invention provides a method for producing a membrane and electrode assembly (MEA) of a fuel cell, the method comprising: forming a composition for forming a catalyst layer by mixing a polymer ionomer, an alcohol solvent, and a polar organic solvent having a boiling point of 30 to 200° C. with a metal catalyst; coating the composition for forming a catalyst layer on both surfaces of a polymer electrolyte membrane to form electrode catalyst layers; and arranging electrode supports on the electrode catalyst layers. Also, the present invention provides an MEA of a fuel cell that is produced according to the method and a fuel cell comprising MEA of a fuel cell.

13 Claims, 2 Drawing Sheets

FOREIGN PATENT DOCUMENTS

| | | |
|---|---|---|
| JP | 8-264190 | 10/1996 |
| JP | 8264190 | 10/1996 |
| JP | 2002-25561 | 1/2002 |
| JP | 2002050367 | 2/2002 |
| JP | 2002075383 | 3/2002 |
| JP | 2002-110180 | 4/2002 |
| JP | 2002110180 | 4/2002 |
| JP | 2002-216801 | 8/2002 |
| JP | 2002-298870 | 10/2002 |
| JP | 2002298870 | 10/2002 |

OTHER PUBLICATIONS

Notice to Submit Response issued by the Korean Patent Office in corresponding application.

Office Action issued by the Japanese Patent Office issued on Jan. 11, 2005.

* cited by examiner

MEMBRANE-ELECTRODE ASSEMBLY OF FUEL CELL, PRODUCTION METHOD OF THE SAME, AND FUEL CELL EMPLOYING THE SAME

BACKGROUND OF THE INVENTION

This application claims the priority of Korean Patent Application No. 2002-65659, filed on Oct. 26, 2002 in the Korean Intellectual Property Office, which is incorporated herein in its entirety by reference.

1. Field of the Invention

The present invention relates to a membrane-electrode assembly (MEA) of a fuel cell, and more particularly, to an MEA of a fuel cell having an enhanced interface characteristic between a polymer electrolyte and electrodes, a production method of the same, and a fuel cell employing the same.

2. Description of the Related Art

Recently, as portable electronic devices and wireless communication devices have developed and vehicles using fuel cells are being developed, the development of high performance fuel cells that are reliable and operate at a low temperature, for example, an ambient temperature, are in demand.

Among fuel cells, there are fuel cells which use polymer electrolyte. PEMFC (proton exchange membrane fuel cell) use hydrogen as anodic fuel and DMFC (Direct methanol fuel cell) use liquid methanol fuel. Liquid methanol fuel is supplied directly to anodic fuel. In such polymer electrolyte fuel cell, a polymer electrolyte membrane is assembled between a cathode and an anode. The polymer electrolyte membrane has to secure low resistance, excellent mechanical property and chemical stability.

The unit of the fuel cell, i.e., membrane-electrode assembly (MEA), is formed by an electrolyte layer and electrodes that are arranged at both sides of the electrolyte layer to generate an oxidation reaction and a reduction reaction. In addition, each of the electrodes includes a support and a catalyst layer. The catalyst layer reacts with the fuel for electrochemical reaction and produce current. The support layer distributes the fuel and maintains the shape of catalysts layer and strength of the unit cell.

Generally, two methods are known to produce an MEA of a fuel cell.

First, after forming electrodes by placing catalyst layers on electrode supports, the electrodes and a polymer electrolyte membrane are hot pressed at a high temperature and under a high pressure so that interfaces between the polymer electrolyte membrane and the electrodes are formed as disclosed in U.S. Pat. No. 6,180,276.

However, where a Nafion membrane is used as a polymer electrolyte membrane and is directly used in a methanol fuel cell or a polymer electrolyte fuel cell, water retention is limited at a high temperature and an ionic conductivity is reduced so that the efficiency of the fuel cell is lowered.

Second, after directly coating and drying a catalyst layer on a Nafion membrane, electrode supports are directly hot pressed to form an MEA, as disclosed by John Appleby and S. Gamburzev in *Journal of Power Source*, Vol. 106 Issues 1–2, pp. 206–214.

The conditions of temperature and pressure in the hot pressing are varied depending on the kind of the polymer that is included in the polymer electrolyte membrane. When a Nafion membrane is used as the polymer electrolyte membrane, an interface between the polymer electrolyte membrane and the electrodes is favorably formed. However, when other material, particularly, a rigid polymer, is used as the polymer electrolyte membrane, the performance of the fuel cell may be deteriorated.

For example, where a sulfonated polymer is used, it is difficult to hot press the sulfonated polymer electrolyte membrane because the sulfonated polymer is brittle. In addition, in the case where a proton conducting polymer is used, there is a difference in the physical property depending on water retention characteristic. For example, the proton conducting polymer cannot retain water at a high temperature, which causes a change in the physical property. Accordingly, when such a polymer is hot pressed at a high temperature and under a high pressure, the physical property of the polymer deteriorates and undesirable problems occur.

SUMMARY OF THE INVENTION

The present invention provides a membrane-electrode assembly (MEA) of a fuel cell that has an enhanced interface characteristic between a polymer electrolyte membrane and electrodes regardless of the kind of materials used as the polymer electrolyte membrane, and a production method of the same. The present invention also provides a fuel cell with improved efficiency by employing such MEA of a fuel cell.

According to an aspect of the present invention, there is provided a method for producing a membrane and electrode assembly (MEA) of a fuel cell, the method comprising:

forming a composition for forming a catalyst layer by mixing a polymer ionomer, an alcohol solvent, and a polar organic solvent having a boiling point of 30 to 200° C. with a metal catalyst;

coating the composition for forming a catalyst layer on both surfaces of a polymer electrolyte membrane to form electrode catalyst layers; and assembling electrode supports on the electrode catalyst layers.

According to another aspect of the present invention, there is provided an MEA of a fuel cell that is produced according to the method.

According to still another aspect of the present invention, there is provided a fuel cell that comprises an MEA of a fuel cell. Preferably the fuel cell is a direct methanol fuel cell.

BRIEF DESCRIPTION OF THE DRAWINGS

The above aspects and advantages of the present invention will become more apparent by describing in detail preferred embodiments thereof with reference to the attached drawings in which.

DETAILED DESCRIPTION OF THE INVENTION

Figure 1:
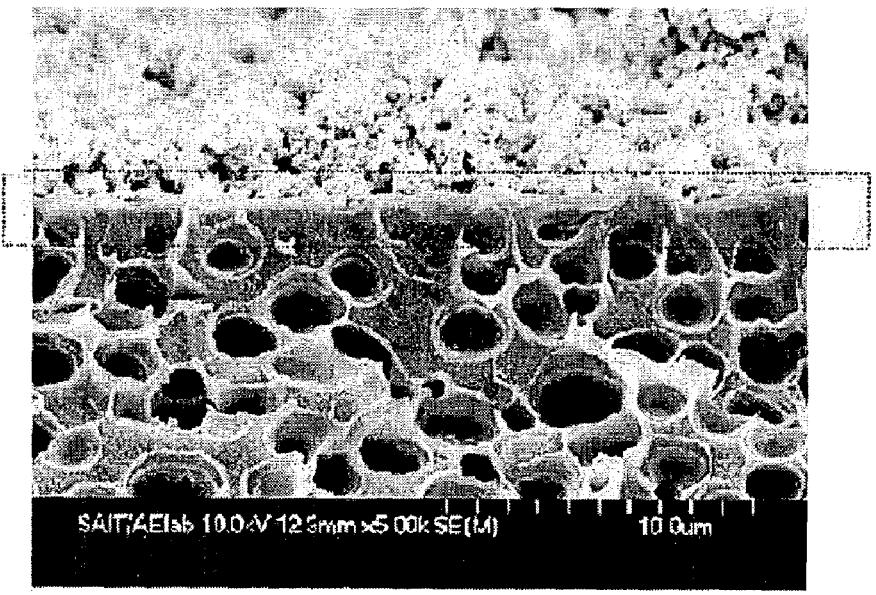
FIG. 1 is a scanning electron microscopy (SEM) photograph illustrating a sectional view of a membrane and electrode assembly (MEA) of a fuel cell, according to an embodiment of the present invention.

The present invention will now be described more fully with reference to the drawings, in which preferred embodiments of the invention are shown.

In the present invention, a composition for forming a catalyst layer on electrodes ("Catalyst Composition") is directly coated and dried on a polymer electrolyte membrane to form an electrode catalyst layer. The composition includes a polar organic solvent that dissolves a polymer, which is included in the polymer electrolyte membrane. As a result, the number of processes for producing a fuel cell is significantly reduced, and an interface between the polymer electrolyte membrane and electrodes is clearly created formed while reducing an interface resistance between the polymer electrolyte membrane and the electrodes. Accordingly, protons can be easily transferred in a fuel cell.

A membrane-electrode assembly (MEA) of a fuel cell and a production method of the same will now be described.

First, a polymer electrolyte membrane is stabilized by drying at a room temperature. In an embodiment, a polymer electrolyte membrane is dried at the room temperature and normal humidity for about 30 to 60 minutes in order to minimize deformation of the polymer electrolyte membrane during a coating process.

The polymer electrolyte membrane is formed of more than one material selected from perfluoropolymer, for example, Nafion ionomer (nafion membrane), sulfonated hydrocarbon polymer, polyimide, particularly, aromatic polyimide, polyvinylidene fluoride, polybenzimidazole (PBI), polysulfone, polyethersulfone, polyetherketone, polyphenylenesulfide, polyphenyleneoxide, polyamide, particulary aromatic polyamide, polyphosphaze, polyethylenenaphthalate, and polyesterpolyimide.

Thereafter, the Catalyst Composition is formed by mixing a metal catalyst, a polymer ionomer, an alcohol solvent, and a polar organic solvent having a boiling point of 30 to 200° C.

The polar organic solvent has a compatibility and a limited solubility characteristics with respect to the polymer of the polymer electrolyte membrane such that the amount of these solvents required to dissolve 1 g of the polymer in the polymer electrolyte membrane is 10 to 2,000 g. Examples of the organic solvent having such characteristics include tetrahydrofuran having a boiling point of 65 to 67° C., dimethylsulfoxide having a boiling point of 189° C., dimethylformamide having a boiling point of 153° C., acetone having a boiling point of 56° C., ethylacetate having a boiling point of 76.5 to 77.5° C., di-ethylether having a boiling point of 34.6° C., and chloroform having a boiling point of 61° C. It is preferable that the polar organic solvent is included in an amount of 50 to 500 parts by weight based on 100 parts by weight of the metal catalyst. When the amount of the polar organic solvent is less than 50 parts by weight, the effect is insignificant. On the other hand, when the amount of the polar organic solvent is greater than 500 parts by weight, the polymer electrolyte membrane cannot operate as a separator.

The metal catalyst is selected from the group consisting of platinum Pt, ruthenium Ru, rhodium Rh, nickel Ni, osmium Os, manganese Mn, titanium Ti, zirconium Zr, tungsten W, iron Fe, molybdenum Mo, iridium Ir, and tin Sn. It is preferable that platinum or its alloy having nano size be used as the metal catalyst.

The polymer ionomer provides a path for ions that are generated by a reaction between a fuel, for example, hydrogen or methanol, and a catalyst to move to the electrolyte membrane. Examples of the polymer ionomer include sulfonated polymers, such as Nafion ionomer, manufactured by DuPont de Nemours and Company and sulfonated polytrifluorostyrene, sulfonated hydrocarbon polymer, polyimide, polyvinylidene fluoride, polybenzimidazole (PBI), polysulfone, polyethersulfone, polyetherketone, polyphenylenesulfide, polyphenyleneoxide, polyamide, polyphosphazene, _polyethylenenaphthalate, and polyesterpolyimide.

It is preferable that the polymer ionomer is included in an amount of 5 to 30 parts by weight based on 100 parts by weight of the metal catalyst. If the amount of the perfluoropolymer ionomer is less than 5 wt %, the ion transfer path is not properly formed in the catalyst layers so that the ions generated by the catalyst reaction cannot move smoothly. If the amount of the perfluoropolymer ionomer is greater than 30 parts by weight, the ionomer covers the entire catalyst layers and the catalyst cannot react with the fuel.

Alcohol solvent is isopropyl alcohol, ethanol, methanol or mixture thereof. It is preferable that isopropyl alcohol is used as the alcohol solvent for the dispersion of metal particles. It is preferable that the alcohol solvent is added in an amount of 1,000 to 5,000 parts by weight based on 100 parts by weight of the metal catalyst. If the amount of alcohol solvent is less than 1,000 parts by weight, the viscosity of the Catalyst Composition becomes excessively high and the dispersion of the catalyst particles is lowered during the coating of the composition and it becomes difficult to form uniform catalyst layers. If the amount of alcohol solvent is greater than 5,000 parts by weight, the viscosity of the Catalyst Composition becomes excessively low and it becomes difficult to coat the composition on the polymer electrolyte membrane.

Thereafter, the polymer electrolyte membrane is fixed in a frame, and the Catalyst Composition is directly coated on both surfaces of the polymer electrolyte membrane to form electrode catalyst layers. The Catalyst Composition can be coated by a spray coating method, a tape casting method, a screen-printing method, or a spin coating method.

It is preferred that the electrode catalyst layers are dried at a temperature of 20 to 90° C., and more preferred at 25 to 30° C.

It is preferable that the thickness of the electrode catalyst layer is 10 to 100 µm. If the thickness of the electrode catalyst layer deviates from the range of 10 to 100 µm, it is difficult to supply the fuel and release byproducts.

Electrode supports are arranged on the surfaces of the electrode catalyst layers to form the MEA of a fuel cell.

In the present invention, a hot pressing process may be performed after arranging the electrode supports on the surfaces of the electrode catalyst layers. The hot pressing process is performed at a temperature of 100 to 300° C. and under a pressure of 1 to 10 ton using a hot press.

Any electrode support generally used in manufacturing a fuel cell can be used but it is preferable that a carbon paper having a porosity of 70 to 80% be used as the electrode support.

In addition, a fuel cell, particularly, a direct methanol fuel cell, is produced by combining a plurality of the MEAs of fuel cell.

Hereafter, examples of the present invention will be described.

EXAMPLE 1

1 g of Pt—Ru, 0.12 g of Nafion ionomer, and 25 g of isopropyl alcohol were mixed, and ultrasonic waves were applied to the mixture under stirring for about 3 minutes. Thereafter, 3 ml of tetrahydrofuran was added to the mixture under stirring to produce a Catalyst Composition.

Meanwhile, a polymer electrolyte membrane was fixed in a frame. Thereafter, the Catalyst Composition was spray coated on both surfaces of the polymer electrolyte membrane, and the coated composition was dried at a temperature of 25° C. to form electrode catalyst layers. Here, Nafion 115 membrane manufactured by DuPont de Nemours and Company was used as the polymer electrolyte membrane and dried at room temperature to be stabilized.

A carbon paper, as an electrode support, was arranged on the electrode catalyst layers to form an MEA of fuel cell. Thereafter, a fuel cell was completed by using such MEAs.

EXAMPLE 2

An MEA of a fuel cell and a fuel cell employing such MEAs of fuel cell were completed according to the same method as described in the Example 1, except sulfonated polytrifluorostyrene was used as the polymer electrolyte membrane instead of Nafion 115 membrane.

EXAMPLE 3

An MEA of a fuel cell and a fuel cell employing MEAs of fuel cell were completed according to the same method as described in the Example 1, except dimethylsulfoxide was used as the Catalyst Composition instead of tetrahydrofuran.

EXAMPLE 4

A fuel cell was completed according to the same method as described in the Example 1, except for additionally arranging the carbon paper as electrode supports on electrode catalyst layers, placing them on a plate maintained at temperature of about 125° C. and hot pressing the carbon paper under a pressure of 0.5 ton for about 5 minutes.

COMPARATIVE EXAMPLE 1

1 g of Pt—Ru, 0.12 g of Nafion ionomer, and 25 g of isopropyl alcohol were mixed, and ultrasonic waves were applied to the mixture under stirring for about 3 minutes to form a Catalyst Composition.

Thereafter, the Catalyst Composition was coated and dried on a hydrophilic carbon paper as an anode support and on a hydrophobic carbon paper as a cathode support to create electrode catalyst layers on the electrode supports so that a cathode and an anode are produced.

A polymer electrolyte membrane was interposed between the cathode and the anode, and the resultant structure was placed on a plate maintained at temperature of about 125° C. and hot pressed under a pressure of 0.5 ton for about 5 minutes. Accordingly, an MEA of a fuel cell was formed. Thereafter, a fuel cell was completed by employing a plurality of the MEAs.

Figure 2:
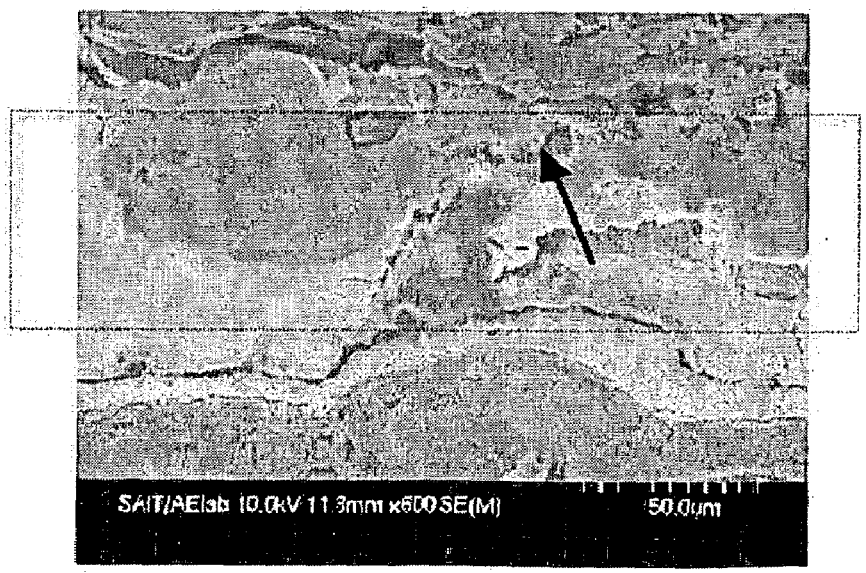
FIG. 2 is an SEM photograph illustrating a sectional view of an MEA of a fuel cell, according to a comparative example of the present invention.
Figure 3:
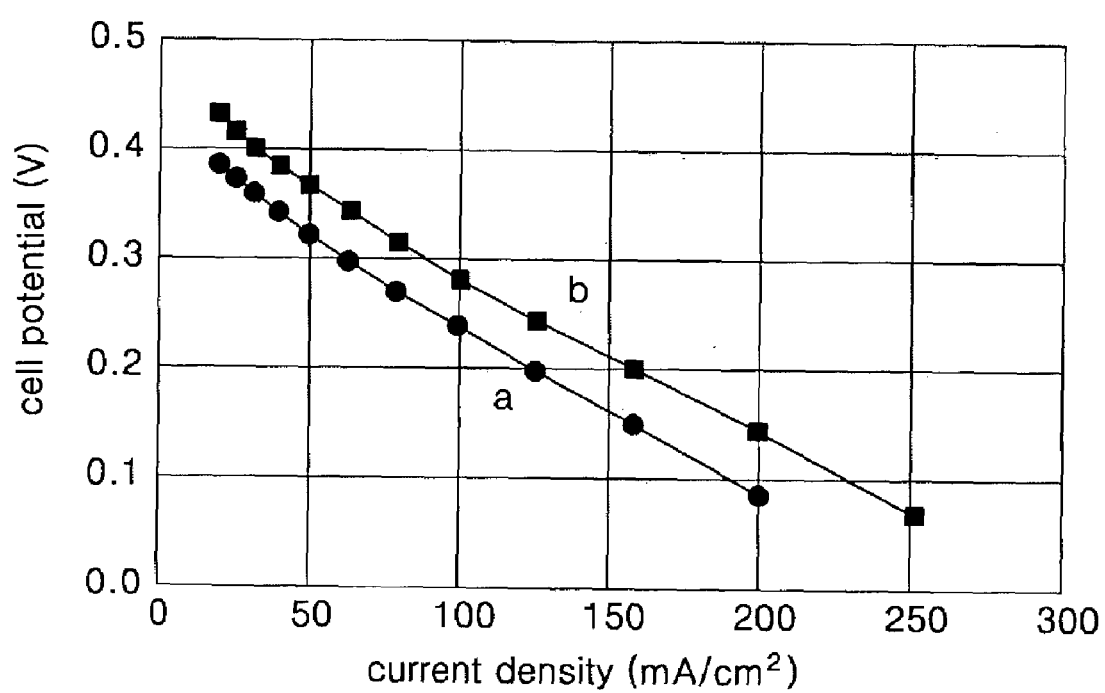
FIG. 3 is a graph illustrating changes in a cell potential according to a current density in a fuel cell according to the embodiment of the present invention.

Interface characteristics between the polymer electrolyte membrane and the electrodes in the fuel cells that are produced according to Example 1 and Comparative Example 1 were measured, and the results are shown in FIGS. 1 and 2. In addition, the changes in a cell potential according to a current density in the fuel cell that is produced according to Example 1 were measured, and the result is shown in FIG. 3. The graph a of FIG. 3 represents the cell potential at a temperature of 50° C. and the graph b of FIG. 3 represents the cell potential at a temperature of 30° C.

Scanning electron microscopy (SEM) photographs of FIGS. 1 and 2 show that an interface between the polymer electrolyte membrane and the electrodes was clearly formed in the MEA of a fuel cell in Example 1. However, an interface was not clearly formed in the MEA of a fuel cell in Comparative Example 1. In addition, the graph of FIG. 3 shows that the current density of the fuel cell was excellent as 50 to 100 mA/cm$^2$ at the cell potential of 0.3 V for Example 1.

The effects of the MEA of a fuel cell are as follows.

First, the Catalyst Composition is directly coated on the polymer electrolyte membrane regardless of the material used for the polymer electrolyte membrane so that the production process of the MEA of a fuel cell is simplified. In addition, the cost and time for producing the MEA of a fuel cell are reduced.

Second, the interface between the polymer electrolyte membrane and the electrodes is easily formed, and an interface resistance between the polymer electrolyte membrane and the electrodes is reduced. As a result, the protons are smoothly transferred in the fuel cell.

As a result, the fuel cell having improved efficiencies can be produced by employing the MEAs of fuel cell according to the present invention.

While this invention has been particularly shown and described with reference to preferred embodiments thereof, it will be understood by those skilled in the art that various changes in form and details may be made without departing from the spirit and scope of the invention as defined by the appended claims.

What is claimed is:

1. A method for producing a membrane and electrode assembly (MEA) of a fuel cell, the method comprising the following steps:

forming a composition for forming a catalyst layer by mixing composition components consisting essentially of a metal catalyst, a polymer ionomer, an alcohol solvent selected from the group consisting of isopropyl alcohol, methanol, and ethanol in an amount of 1.000 to 5.000 parts by weight based on 100 parts by weight of the metal catalyst, and a polar organic solvent having a boiling point of 30 to 200° C. in an amount of 50 to 500 parts by weight based on 100 parts by weight of the metal catalyst;

coating the composition for forming a catalyst layer directly on both surfaces of a polymer electrolyte membrane followed by drying to form electrode catalyst layers; and assembling electrode supports on the electrode catalyst layers.

2. The method of claim 1, wherein the polar organic solvent has compatibility with the polymer which is included in the polymer electrolyte membrane and has a limited solubility characteristic with respect to the polymer of the polymer electrolyte membrane such that the amount of polar organic solvent required to dissolve 1 g of the polymer in the polymer electrolyte membrane is 10 to 2,000 g.

3. The method of claim 1, wherein the polar organic solvent has compatibility with the polymer which is included in the polymer electrolyte membrane and is selected from the group consisting of tetrahydrofuran, dimethylsulfoxide, dimethylformamide, acetone, ethylacetate, diethylether, and chloroform.

4. The method of claim 1, wherein the catalyst composition is coated by a spray coating method, a tape casting method, a screen printing, or a spin coating method.

5. The method of claim 1, wherein the catalyst composition is coated and dried at a temperature of 20 to 90° C.

6. The method of claim 1, wherein the polymer electrolyte membrane is formed of a material selected from perfluoropolymer, sulfonated hydrocarbon polymer, polyimide, polyvinylidene fluoride, polybenzimidazole (PBI), polysulfone, polyethersulfone, polyetherketone, polyphenylenesultide, polyphenyleneoxide, polyamide, polyphisphazene, polyethylenenaphthalate, and polyester.

7. The method of claim 1, wherein the metal catalyst is selected from the group consisting of platinum (Pt), ruthenium (Ru), rhodium (Rh), nickel (Ni), osmium (Os), manganese (Mn), titanium (Ti), zirconium (Zr), tungsten (W), iron (Fe), molybdenum (Mo), iridium (Ir), and tin (Sn).

8. The method of claim 1, wherein the polymer ionomer is selected from the group consisting of Nafion ionomer, sulfonated polytrifluorostyrene, sulfonated hydrocarbon polymer, polyimide, polyvinylidene fluoride, polybenzimidazole, polysulfone, polyethersulfone, polyetherketone, polyphenylenesulfide, polyphenyleneoxide, polyphosphazene, polyethylenenaphthalate, polyamide, and polyester, and is added in an amount of 5 to 30 parts by weight based on 100 parts by weight of the metal catalyst.

9. An MEA of a fuel cell that is produced according to the method of claim 1.

10. A fuel cell that comprises an MEA of a fuel cell, which is produced according to the method of claim 1.

11. The fuel cell of claim 10 wherein the fuel cell is a direct methanol fuel cell.

12. The method according to claim 1, wherein the metal catalyst is platinum or an alloy thereof having a nanoparticles size.

13. The method according to claim 1, wherein the metal catalyst is Pt-Ru.

* * * * *